(12) United States Patent
Wada et al.

(10) Patent No.: US 11,820,431 B2
(45) Date of Patent: Nov. 21, 2023

(54) VEHICLE BODY DAMPER BRACE

(71) Applicant: Sumitomo Riko Company Limited, Komaki (JP)

(72) Inventors: Munehiro Wada, Komaki (JP); Hiroyuki Ichikawa, Komaki (JP); Takashi Kume, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 17/481,939

(22) Filed: Sep. 22, 2021

(65) Prior Publication Data

US 2022/0009553 A1     Jan. 13, 2022

Related U.S. Application Data

(63) Continuation of application No. PCT/JP2020/037466, filed on Oct. 1, 2020.

(30) Foreign Application Priority Data

Oct. 29, 2019    (JP) .................................. 2019-196319

(51) Int. Cl.
     *F16F 3/093*      (2006.01)
     *B62D 21/11*      (2006.01)

(52) U.S. Cl.
     CPC .............. *B62D 21/11* (2013.01); *F16F 3/093* (2013.01); *F16F 2230/0005* (2013.01)

(58) Field of Classification Search
     CPC .......... F16F 3/093; F16F 3/0935; F16F 9/306; F16F 2230/0005; B62D 21/11
(Continued)

(56) References Cited

U.S. PATENT DOCUMENTS

| | | | | |
|---|---|---|---|---|
| 2,762,600 A | * | 9/1956 | Spencer | ................... F16F 1/393 |
| | | | | 267/141.5 |
| 4,981,308 A | * | 1/1991 | Kunert | ..................... B60G 7/02 |
| | | | | 403/228 |

(Continued)

FOREIGN PATENT DOCUMENTS

| | | | | |
|---|---|---|---|---|
| CN | 105202090 A | | 12/2015 | |
| FR | 2650869 A1 | * | 2/1991 | .............. F16F 3/093 |

(Continued)

OTHER PUBLICATIONS

Machine translation, FR 2650869. (Year: 1991).*

(Continued)

*Primary Examiner* — Thomas J Williams
(74) *Attorney, Agent, or Firm* — Jason M. Shapiro; Devlin Law Firm LLC

(57) ABSTRACT

A vehicle body damper brace including: a rod member having an elongated shape; a housing including a tubular part arranged externally about the rod member; an elastic connector including a first connection body comprising a viscoelastic material, the elastic connector elastically connecting the rod member and the housing to each other in an axis-perpendicular direction; and a regulator provided on at least one axial side of the first connection body and separately from the elastic connector, the regulator suppressing an amount of relative displacement between the rod member and the housing in a prizing direction.

10 Claims, 9 Drawing Sheets

(58) Field of Classification Search
USPC ......... 267/292, 293, 294, 141, 141.2, 141.3, 267/141.4, 141.5
See application file for complete search history.

(56) References Cited

U.S. PATENT DOCUMENTS

| | | | | |
|---|---|---|---|---|
| 5,284,330 | A * | 2/1994 | Carlson | H01F 1/447 188/267.2 |
| 5,299,790 | A * | 4/1994 | Whightsil, Sr. | F16F 1/3849 267/292 |
| 5,501,434 | A * | 3/1996 | McGuire | F16F 13/1463 416/140 |
| 6,092,795 | A * | 7/2000 | McGuire | F16F 13/24 267/140.13 |
| 6,854,723 | B2 * | 2/2005 | Ogawa | F16F 1/3842 267/141.5 |
| 9,188,190 | B2 * | 11/2015 | Bosworth | F16F 13/08 |
| 9,321,527 | B2 * | 4/2016 | Louis | B64C 27/51 |
| 2003/0111780 | A1 | 6/2003 | Ogawa et al. | |
| 2015/0375788 | A1 * | 12/2015 | Yun | F16F 1/3842 267/292 |
| 2018/0149227 | A1 | 5/2018 | Iwanaga | |
| 2022/0009553 | A1 * | 1/2022 | Wada | F16F 1/3814 |

FOREIGN PATENT DOCUMENTS

| | | | | |
|---|---|---|---|---|
| FR | 2950027 | A1 | | 3/2011 |
| JP | 57208332 | A * | 12/1982 | F16F 1/3814 |
| JP | S62-62040 | U | | 4/1987 |
| JP | 02256932 | A * | 10/1990 | |
| JP | H04-165132 | A | | 6/1992 |
| JP | 2000264087 | A | | 9/2000 |
| JP | 2006-347370 | A | | 12/2006 |
| JP | 2007-315531 | A | | 12/2007 |
| JP | 2009-241656 | A | | 10/2009 |
| JP | 2016084066 | A | | 5/2016 |

OTHER PUBLICATIONS

Translation JP 2007-315531 A, Mitsui. (Year: 2007).*
Japanese Office Action in corresponding Japanese Patent Application No. 2021-528334, dated Jan. 31, 2022, 16 pages.
Search Report issued in corresponding International Patent Application No. PCT/JP2020/037466, dated Dec. 3, 2020, with English translation (6 pages).
English translation of the International Preliminary Report on Patentability (Chapter I) issued in International Application No. PCT/JP2020/037466, dated May 3, 2022, 8 pages.
English translation of the Office Action issued issued in Chinese Application No. 202080032917.3, dated Feb. 6, 2023.
English translation of the Office Action issued issued in German Application No. 112020003594.8, dated Feb. 3, 2023.
English translation of the Office Action issued in Chinese Application No. 202080032917.3, dated Jul. 7, 2023.

* cited by examiner

VEHICLE BODY DAMPER BRACE

INCORPORATED BY REFERENCE

This application is a Continuation of International Application No. PCT/JP2020/037466 filed Oct. 1, 2020, which claims priority under 35 U.S.C. §§ 119(a) and 365 of Japanese Patent Application No. 2019-196319 filed on Oct. 29, 2019, the disclosures of which are expressly incorporated herein by reference in their entireties.

BACKGROUND OF THE INVENTION

1. Field of the Invention

The present invention relates to a vehicle body damper brace capable of adjusting ride comfort and traveling performance by being mounted on a vehicle body.

2. Description of the Related Art

Conventionally, a vehicle body damper brace mounted on a vehicle body frame or the like is known. The vehicle body damper brace includes, for example, a vehicle body reinforcing device disclosed in U.S. Publication No. US 2018/149227 A1 or the like. The vehicle body reinforcing device of US 2018/149227 A1 is provided with a rod member and a housing which are attached to mutually different portions of a vehicle body. When the rod member and the housing are displaced relative to each other in the axial direction, damping force by the friction mechanism will be exerted between the rod member and the housing.

Meanwhile, when the vehicle body damper brace is used, a load in the axial direction is primarily input. Therefore, for example, the vehicle body reinforcing device shown in US 2018/149227 A1 has a structure in which the rod member and the housing are slidably assembled in the axial direction in the friction mechanism, and relative displacement between the rod member and the housing in the prizing direction or the like is hardly permitted mechanically.

SUMMARY OF THE INVENTION

However, studies by the present inventors revealed that the vehicle body damper brace mounted on the vehicle body may be subjected to not only the force in the axial direction but also the force in the prizing direction, and that durability with respect to the input in the prizing direction and stabilization of the axial characteristics under the input in the prizing direction and the like are also important.

It is therefore one object of the present invention to provide a vehicle body damper brace of novel structure which is able to reliably obtain durability under the condition of not only the input in the axial direction but also the input in the prizing direction, and to stably exhibit the axial characteristics.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a vehicle body damper brace comprising: (a) a rod member having an elongated shape; (b) a housing including a tubular part arranged externally about the rod member; (c) an elastic connector including a first connection body comprising a viscoelastic material, the elastic connector elastically connecting the rod member and the housing to each other in an axis-perpendicular direction; and (d) a regulator provided on at least one axial side of the first connection body and separately from the elastic connector, the regulator suppressing an amount of relative displacement between the rod member and the housing in a prizing direction.

According to the vehicle body damper brace structured following the present preferred embodiment, the relative displacement of the rod member and the housing in the axial direction is permitted by the elastic deformation of the first connection body. Thus, as compared with the structure described in US 2018/149227 A1 in which the rod member and the housing are slidable in the axial direction by the friction mechanism, mechanical damage caused by the input in the prizing direction can be easily avoided. In addition, when the input in the axial direction is applied under the input in the prizing direction, the friction mechanism described in US 2018/149227 A1 may cause catching, local wear or the like of the sliding surface. On the other hand, in the present preferred embodiment, stable characteristics such as damping performance which is intended in the axial direction, for example, can be maintained on the basis of the elastic deformation of the first connection body.

In addition, a regulator is provided on the outer side in the axial direction of the elastic connector, and the amount of the elastic deformation in the prizing direction of the first connection body is suppressed. With this configuration, even when a sharply excessive input in the prizing direction or the like is applied, for example, such a large prizing deformation as to adversely affect the damping performance which is intended in the axial direction can be prevented, thereby more stably exhibiting the intended characteristics by the elastic connector. Besides, as a result of preventing excessive prizing deformation of the first connection body, the durability of the elastic connector can also be improved.

In particular, the regulator is provided separately from the elastic connector. Thus, the degree of freedom of design such as the material and the shape of both members is largely obtained, and the performance required of the elastic connector and the performance required of the regulator can each be realized at a high degree.

A second preferred embodiment provides the vehicle body damper brace according to the first preferred embodiment, wherein the regulator has a structure in which an inner attachment member attached to a rod member side and an outer attachment member attached to a housing side are elastically connected by a second connection body comprising a viscoelastic material.

According to the vehicle body damper brace structured following the present preferred embodiment, since the regulator has a bushing structure, the degree of freedom in tuning of the characteristics of the regulator can be greatly obtained. Further, when relative prizing displacement of the rod member and the housing is suppressed by the regulator, since the regulator is provided with a second connection body comprising a viscoelastic material, the amount of relative prizing displacement of the rod member and the housing is suppressed in cushioned fashion, thereby reducing an adverse effect on ride comfort or the like.

A third preferred embodiment provides the vehicle body damper brace according to the first or second preferred embodiment, wherein an axial dimension of the second connection body of the regulator is smaller than an axial dimension of the first connection body of the elastic connector.

According to the vehicle body damper brace structured following the present preferred embodiment, the characteristics of the elastic connector can contribute to the characteristics of the entire vehicle body damper brace more greatly than the characteristics of the regulator. Besides, the regulator is less likely to have an influence on the characteristics with respect to input in the axial direction, thereby avoiding a high spring or the like due to the provision of the regulator, for example.

A fourth preferred embodiment provides the vehicle body damper brace according to the second or third preferred embodiment, wherein the rod member side includes a first flanged part projecting radially outward, and the outer attachment member includes a second flanged part projecting radially inward, and a buffer body comprising a viscoelastic material is interposed between axially opposed faces of the first flanged part and the second flanged part.

According to the vehicle body damper brace structured following the present preferred embodiment, when a force in the prizing direction acts between the rod member and the housing, the amount of relative displacement of the rod member and the housing in the prizing direction is suppressed by the first flanged part and the second flanged part coming into contact via the buffer body. Also, when a force in the axial direction acts between the rod member and the housing, by the buffer body being compressed between the first flanged part and the second flanged part, it is possible to achieve hard spring characteristics, thereby obtaining a large degree of freedom in tuning the spring in the axial direction.

A fifth preferred embodiment provides the vehicle body damper brace according to the fourth preferred embodiment, wherein the outer attachment member extends in a circumferential direction with a U-shaped cross section opening radially inward, and at least one of a pair of side walls of the outer attachment member comprises the second flanged part.

According to the vehicle body damper brace structured following the present preferred embodiment, the outer attachment member can be formed in a plane symmetrical shape with respect to a plane orthogonal to the axial direction. For example, if the inner attachment member and the second connection body are also formed in a plane symmetrical shape with respect to the plane orthogonal to the axis, the entire second bushing may be formed in a plane symmetrical shape with respect to the plane orthogonal to the axis. Accordingly, when the second bushing is attached to the rod member or the housing, attachment in a wrong orientation can be prevented.

A sixth preferred embodiment provides the vehicle body damper brace according to the first preferred embodiment, wherein the regulator includes a first flanged part projecting radially outward from a rod member side, a second flanged part projecting radially inward from a tubular part side of the housing, and a buffer body arranged between axially opposed faces of the first flanged part and the second flanged part while comprising a viscoelastic material.

According to the vehicle body damper brace structured following the present preferred embodiment, when a force in the prizing direction acts between the rod member and the housing, the amount of relative displacement of the rod member and the housing in the prizing direction is suppressed by the first flanged part and the second flanged part coming into contact via the buffer body. Also, when a force in the axial direction acts between the rod member and the housing, by the buffer body being compressed between the first flanged part and the second flanged part, it is possible to achieve hard spring characteristics, thereby obtaining a large degree of freedom in tuning the spring in the axial direction.

A seventh preferred embodiment provides the vehicle body damper brace according to any one of the first through sixth preferred embodiments, wherein an inner circumferential surface of the first connection body is fastened to an inner tube member fixed to the rod member in an externally fitted state, and the regulator is attached to the inner tube member in an externally fitted state.

According to the vehicle body damper brace structured following the present preferred embodiment, the regulator is attached to the inner tube member constituting the elastic connector, so that the elastic connector and the regulator can be easily arranged in proper positions relative to each other.

An eighth preferred embodiment provides the vehicle body damper brace according to any one of the first through seventh preferred embodiments, wherein the regulator is arranged axially away from the first connection body of the elastic connector.

According to the vehicle body damper brace structured following the present preferred embodiment, when the first connection body is deformed, the regulator is less likely to interfere with the first connection body, thereby stably obtaining the desired characteristics of the first connection body such as spring characteristics and damping characteristics. Besides, damage due to contact of the first connection body with the regulator is avoided.

A ninth preferred embodiment provides the vehicle body damper brace according to any one of the first through eighth preferred embodiments, wherein the regulator extends in a circumferential direction, and the regulator is divided at least at a part in the circumferential direction.

According to the vehicle body damper brace structured following the present preferred embodiment, the regulator is divided at least at a part in the circumferential direction, so that it is possible to adjust the spring characteristics, damping characteristics and the like of the regulator. In the case where the regulator has a C-shaped cross section divided at a part in the circumferential direction, for example, when the regulator is attached to the rod member, the inner tube member of the elastic connector, or the like in an externally fitted state, dimensional errors of the regulator, the rod member, the inner tube member or the like are absorbed by the divided portion, thereby permitting stable attachment.

A tenth preferred embodiment provides the vehicle body damper brace according to any one of the first through ninth preferred embodiments, wherein materials of the elastic connector and the regulator are different from each other.

According to the vehicle body damper brace structured following the present preferred embodiment, the performance required of the elastic connector and the performance required of the regulator can each be realized at a high degree.

An eleventh preferred embodiment provides the vehicle body damper brace according to any one of the first through tenth preferred embodiments, wherein the regulator is movable in an axial direction with respect to at least one of the rod member and the housing.

According to the vehicle body damper brace structured following the present preferred embodiment, the influence of the regulator on the axial characteristics of the vehicle body damper brace is further suppressed. Therefore, in the vehicle body damper brace, for example, the low spring characteristics in the axial direction can be more efficiently realized.

According to the present invention, the vehicle body damper brace is able to obtain durability with respect to not only the input in the axial direction but also the input in the prizing direction.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Hereinafter, practical embodiments of the present invention will be described with reference to the drawings.

Figure 1:
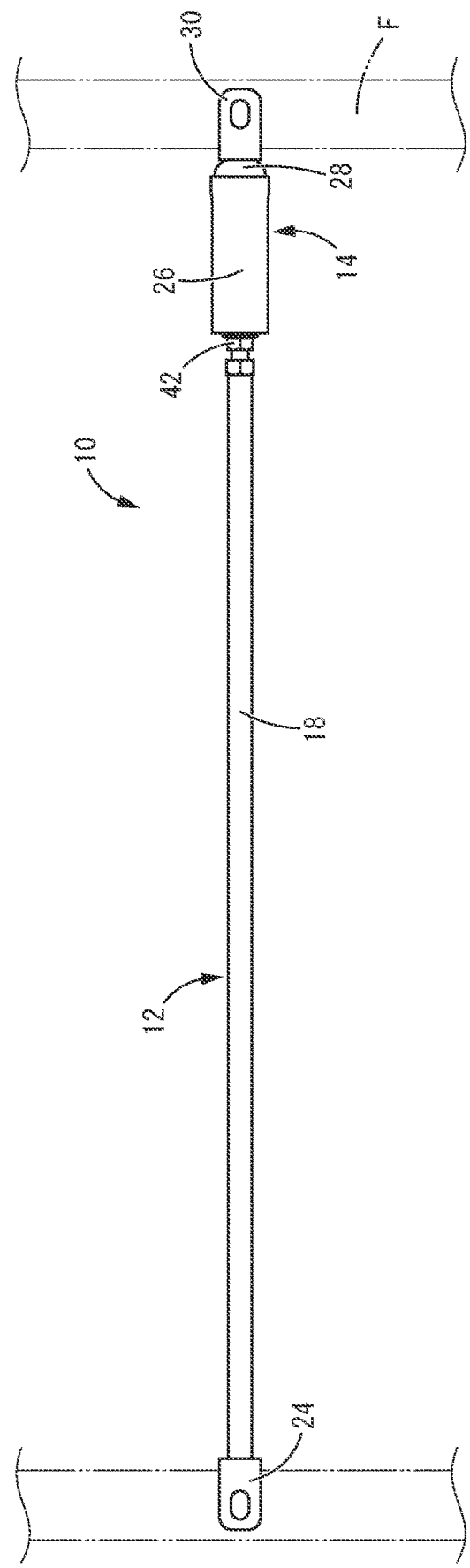
FIG. 1 is a plan view showing a vehicle body damper brace according to a first practical embodiment of the present invention.
Figure 2:
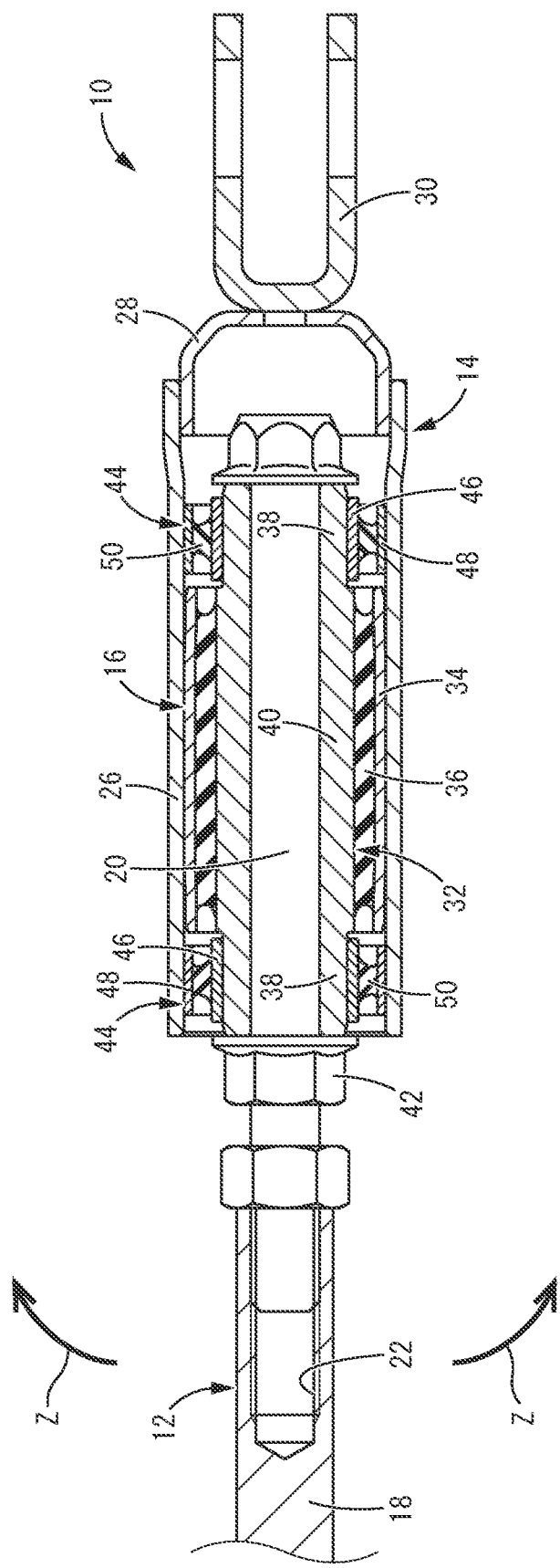
FIG. 2 is a vertical cross sectional view showing a part of the vehicle body damper brace of FIG. 1.

FIG. 1 shows a vehicle body damper brace 10 according to a first practical embodiment of the present invention. As shown in FIG. 2, the vehicle body damper brace 10 has a structure in which a rod member 12 and a housing 14 are elastically connected to each other by a first bushing 16 serving as an elastic connector. In the following description, as a general rule, the axial direction refers to the left-right direction in FIGS. 1 and 2, which coincides with the center axis direction of the rod member 12 and the first bushing 16 in the stationary state.

The rod member 12 has an elongated bar shape overall, and includes a rod main body 18 having a solid, circular post shape and an inner bolt 20 screwed to one axial end of the rod main body 18. The rod main body 18 includes a screw hole 22 opening onto one axial end face thereof, and a first mounting part 24 provided at the other axial end, which is configured to be attached to a vehicle body frame F (see FIG. 1). As shown in FIG. 2, the inner bolt 20 has a thread formed at its axial end, and is screwed to the screw hole 22 of the rod main body 18 so as to project from the rod main body 18 to one axial side (the right side in FIG. 2).

The housing 14 includes a tubular part 26 having a generally cylindrical shape with a diameter larger than that of the inner bolt 20, and a cap 28 fixed by press-fitting to the opening portion on the one axial side of the tubular part 26. The cap 28 has a generally bottomed tubular shape and is provided so as to close the opening on the one axial side of the tubular part 26. At the bottom of the cap 28, a second mounting part 30 configured to be attached to the vehicle body frame F is provided so as to protrude to the one axial side. The cap 28 of the present practical embodiment is fixed by press-fitting to the radial inside of the tubular part 26, but may alternatively be fixed by being externally fitted onto the tubular part 26. Also, the cap 28 may alternatively be inserted into or be externally placed about the tubular part 26 to be fixed by means of bonding, welding, or the like.

Figure 3:
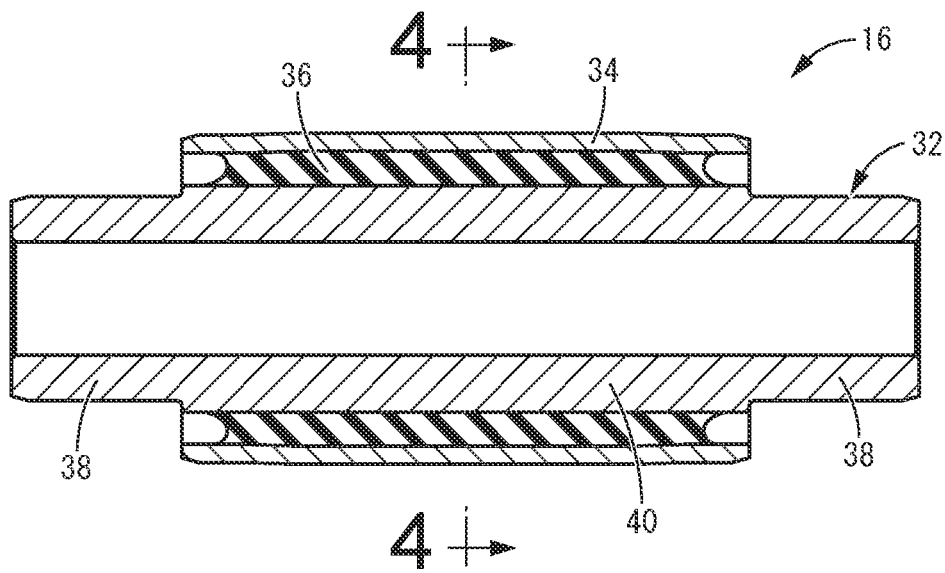
FIG. 3 is a vertical cross sectional view of a first bushing constituting the vehicle body damper brace shown in FIG. 2, taken along line 3-3 of FIG. 4.
Figure 4:
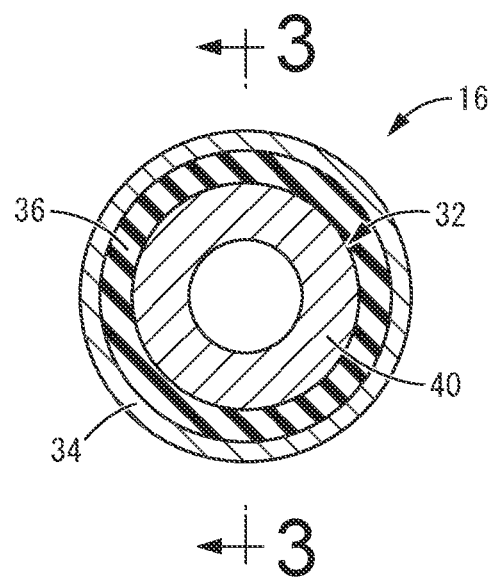
FIG. 4 is a cross sectional view taken along line 4-4 of FIG. 3.

The tubular part 26 of the housing 14 is arranged externally about the inner bolt 20, and the first bushing 16 is disposed between the inner bolt 20 and the tubular part 26. As shown in FIGS. 3 and 4, the first bushing 16 has a structure in which an inner tube member 32 and an outer tube member 34 are elastically connected by a first connection body 36.

The inner tube member 32 is a generally cylindrical member mounted in an externally fitted state to the inner bolt 20. The inner tube member 32 has an inner diameter dimension that is generally constant throughout the axial direction. The axially opposite end portions of the inner tube member 32 comprise mounting parts 38, 38 each having an outer diameter dimension that is smaller than that of the axially central portion. The axially central portion of the inner tube member 32 off the mounting parts 38, 38 comprises a fastening part 40 having an outer diameter dimension larger than that of the mounting part 38.

The outer tube member 34 has a generally cylindrical shape having a diameter larger than that of the inner tube member 32. The outer tube member 34 has an axial length shorter than that of the inner tube member 32, and is arranged externally about and in opposition to the fastening part 40 of the inner tube member 32.

The first connection body 36 is provided radially between the inner tube member 32 and the outer tube member 34. The first connection body 36 is formed of a viscoelastic material having viscosity in addition to elasticity, and is formed of a polymer elastomer such as a rubber elastic body and a synthetic resin elastomer, for example. The first connection body 36 is preferably a high-damping elastic body which is excellent in energy damping performance due to internal friction during elastic deformation or the like, and is formed of, for example, a material such as isobutylene isoprene rubber (IIR) and styrene butadiene rubber (SBR). The first connection body 36 has a generally cylindrical shape, and the inner circumferential surface thereof is fastened to the outer circumferential surface of the fastening part 40 of the inner tube member 32, while the outer circumferential surface thereof is fastened to the inner circumferential surface of the outer tube member 34. In order to reduce tensile stress in the radial direction due to thermal shrinkage after the first connection body 36 is molded, it is desirable to apply a diameter reduction process to the outer tube member 34 or to apply a diameter enlarging process to the inner tube member 32 after the first connection body 36 is molded.

As shown in FIG. 2, the inner tube member 32 is fixed to the inner bolt 20 of the rod member 12 in an externally fitted state, and the outer tube member 34 is fixed to the tubular part 26 of the housing 14 in a press-fitted state, so that the first bushing 16 is interposed between the rod member 12 and the housing 14. With this configuration, the rod member 12 and the housing 14 are elastically connected by the first connection body 36. Regarding the inner tube member 32, one axial end face is in contact with the head part of the inner bolt 20, while the other axial end face is in contact with a nut 42 screwed to the inner bolt 20, so that the inner tube member 32 is axially positioned between the head part of the inner bolt 20 and the nut 42.

The method of attaching the outer tube member 34 of the first bushing 16 to the tubular part 26 of the housing 14 is not limited to press-fitting. For example, by reducing the diameter of the tubular part 26 with the outer tube member 34 disposed in the radial inside of the tubular part 26, the tubular part 26 can be fixed to the outer tube member 34 in an externally fitted state. In this case, it would also be possible to reduce the outer tube member 34 in diameter during the diameter reduction process of the tubular part 26 to reduce the tensile stress in the radial direction of the first connection body 36.

Figure 5:
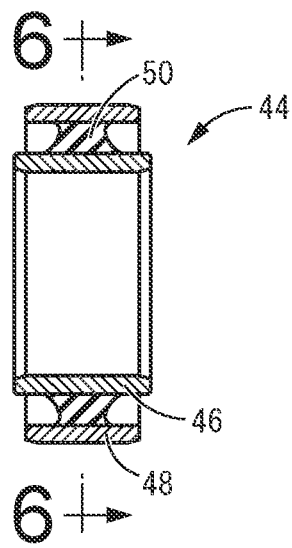
FIG. 5 is a vertical cross sectional view of a second bushing constituting the vehicle body damper brace shown in FIG. 2, taken along line 5-5 of FIG. 6.
Figure 6:
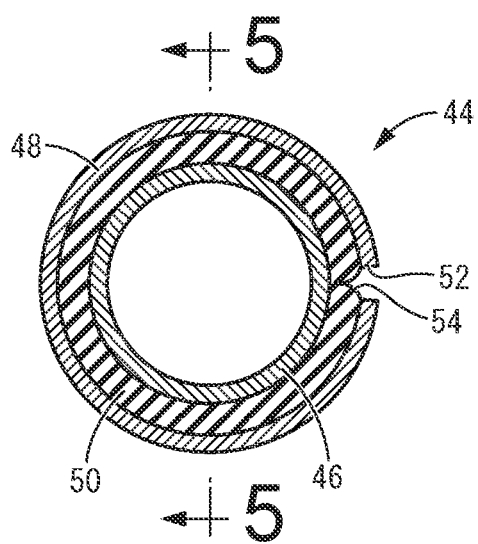
FIG. 6 is a cross sectional view taken along line 6-6 of FIG. 5.

To the axially opposite end portions of the inner tube member 32 of the first bushing 16, respective second bushings 44 serving as regulators are attached. The second bushing 44 has a generally annular shape extending in the circumferential direction overall, and has a structure in which an inner attachment member 46 and an outer attachment member 48 are elastically connected by a second connection body 50, as shown in FIGS. 5 and 6.

The inner attachment member 46 has a generally cylindrical shape and has an inner diameter dimension slightly smaller than the outer diameter dimension of the mounting part 38 of the inner tube member 32.

The outer attachment member 48 has a generally cylindrical shape having a diameter larger than that of the inner attachment member 46. The outer attachment member 48 includes a slit-shaped notch 52 penetrating in the axial and radial directions in a part in the circumferential direction, thereby having a generally C-shaped annular transverse cross section that is divided at a part in the circumferential direction.

The second connection body 50 is provided radially between the inner attachment member 46 and the outer attachment member 48. Similarly to the first connection body 36, the second connection body 50 is formed of a viscoelastic material having viscosity in addition to elasticity, and is formed of a polymer elastomer such as a rubber elastic body and a synthetic resin elastomer, for example. The second connection body 50 may be the same material as the first connection body 36. However, since the first bushing 16 and the second bushing 44 are separately provided, it is easy to form the second connection body 50 of a material different from that of the first connection body 36. By forming the first connection body 36 and the second connection body 50 of materials different from each other, performance such as soft spring characteristics (low spring characteristics) in the axial direction or the like required of the first connection body 36 and performance such as hard spring characteristics (high spring characteristics) in the axis-perpendicular direction required of the second connection body 50 can each be realized at a high degree.

The second connection body 50 has a generally cylindrical shape, and the inner circumferential surface thereof is fixed to the outer circumferential surface of the fastening part 40 of the inner tube member 32, while the outer circumferential surface thereof is fixed to the inner circumferential surface of the outer tube member 34. The second connection body 50 has a notch 54 which opens to the outer circumferential surface in a part in the circumferential direction, and the notch 54 is aligned with the notch 52 of the outer attachment member 48 and is exposed radially outward. With this configuration, regarding the second bushing 44, its radially outer portion is partially divided at a part in the circumferential direction. As a result, when the second connection body 50 is shrunk by cooling after molding, the deformation of the outer attachment member 48 and the second connection body 50 is permitted by the notches 52, 54, thereby reducing or eliminating the tensile stress acting on the second connection body 50 due to the shrinkage.

The axial dimension of the second connection body 50 is smaller than the axial dimension of the first connection body 36. Thus, the spring constant in the axial direction of the second connection body 50 is smaller than the spring constant in the axial direction of the first connection body 36. Preferably, the axial dimension of the second connection body 50 is ¼ or smaller than the axial dimension of the first connection body 36.

The inner attachment member 46 of the second bushing 44 is attached to the rod member 12 side by being fixed to the mounting parts 38, 38 provided at the axially opposite ends of the inner tube member 32 of the first bushing 16 in an externally fitted state. The outer attachment member 48 of the second bushing 44 is fixed by press-fitting to the tubular part 26 of the housing 14. With these arrangements, the second bushing 44 is interposed between the rod member 12 and the housing 14, and the rod member 12 and the housing 14 are elastically connected to each other by the second connection body 50 on the outer side in the axial direction than the first connection body 36. The outer attachment member 48 of the second bushing 44 is not necessarily fixed to the tubular part 26 of the housing 14, but may be attached so as to be slidable in the axial direction.

By the inner attachment member 46 being fixed to the inner tube member 32, for example, it would also be possible to attach the first bushing 16 and the second bushing 44 to the rod member 12 (the inner bolt 20) at the same time with the inner attachment member 46 positioned with respect to the inner tube member 32. Therefore, relative positioning of the first bushing 16 and the second bushing 44 is facilitated, and positioning of the first bushing 16 and the second bushing 44 with respect to the rod member 12 is also facilitated.

The second bushing 44 is located axially outside and away from the first connection body 36 of the first bushing 16. With this configuration, elastic deformation of the first connection body 36 is not obstructed by contact with the second bushing 44, and damage to the first connection body 36 caused by contact with the second bushing 44 is also avoided. The outer attachment member 48 of the second bushing 44 is axially away from the outer tube member 34 of the first bushing 16. However, the outer tube member 34 and the outer attachment member 48 may be arranged in a state where their axial end faces are in contact with each other.

The method of mounting the outer attachment member 48 of the second bushing 44 to the tubular part 26 of the housing 14 is not limited to press-fitting. For example, by reducing the diameter of the tubular part 26 with the outer attachment member 48 disposed on the radial inside of the tubular part 26, the tubular part 26 can also be fixed to the outer attachment member 48 in an externally fitted state. In this case, when the diameter of the tubular part 26 is reduced, it would also be possible to reduce the diameter of the outer attachment member 48 so as to decrease the tensile stress of the second connection body 50 in the radial direction.

As shown in FIG. 1, the vehicle body damper brace 10 of the above construction is used by the first and second mounting parts 24, 30 respectively provided to the rod member 12 and the housing 14 being attached to the vehicle body frame F. In the mounted state onto the vehicle body, a load in the axial direction is primarily input to the vehicle body damper brace 10. When the load in the axial direction is input to the vehicle body damper brace 10, the rod member 12 and the housing 14 relatively displace in the axial direction, and the first connection body 36 of the first bushing 16 elastically connecting the rod member 12 and the housing 14 is elastically deformed. As a result, the input load is reduced by the energy attenuation action such as internal friction based on the viscoelasticity of the first connection body 36. By so doing, the deformation speed of the vehicle body frame F due to, for example, the roll, acceleration and deceleration, etc. during driving is reduced, thereby improving the driving stability of the vehicle or the like.

As shown in FIG. 2, the second connection body 50 of the second bushing 44 is smaller in axial dimension than the first connection body 36 of the first bushing 16, so that the influence of the second connection body 50 on the axial characteristics of the vehicle body damper brace 10 is small. Therefore, even if the second bushing 44 is provided in the vehicle body damper brace 10, for example, the low dynamic spring characteristics in the axial direction by the shear spring component of the first connection body 36 can be advantageously realized. If the outer attachment member 48 of the second bushing 44 is slidably attached to the tubular part 26 of the housing 14 or the like so as to be movable in the axial direction, the influence of the second bushing 44 on the axial characteristics of the vehicle body damper brace 10 can be reduced.

When the load in the prizing direction is input to the vehicle body damper brace 10 attached to the vehicle body frame F, the rod member 12 and the housing 14 relatively tilt. Here, the prizing direction refers to the direction in which the center axis of the rod member 12 tilts with respect to the center axis of the housing 14, as shown by arrows Z in FIG. 2. Then, the second connection bodies 50, 50 of the second bushings 44 disposed on the outer side in the axial direction than the first connection body 36 of the first bushing 16 are compressed in the axis-perpendicular direction between the rod member 12 and the housing 14. By so doing, in the second bushing 44 in which the second connection body 50 is compressed, the hard spring characteristics of the compression spring component of the second connection body 50 is manifested, and the amount of relative tilting (the amount of relative displacement in the prizing direction) between the rod member 12 and the housing 14 is suppressed. As a result, the adverse effect on the steering stability of the vehicle due to the prizing displacement of the rod member 12 and the housing 14 is reduced, and the amount of elastic deformation in the prizing direction of the first connection body 36 is limited, thereby improving the durability of the first connection body 36 as well.

In addition, at the time of large input in the prizing direction, the relative tilting of the rod member 12 and the housing 14 is suppressed by the second bushing 44. This will avoid the elastic deformation in the prizing direction of the first connection body 36 of an extent such that the damping performance targeted in the axial direction is adversely affected, for example. Therefore, the desired characteristics of the first bushing 16 can each be more stably exhibited.

In this way, in the vehicle body damper brace 10, the second bushings 44, 44 receiving the input in the prizing direction are provided separately from the first bushing 16 receiving the input in the axial direction. Therefore, according to the vehicle body damper brace 10, characteristics such as the low dynamic spring required with respect to the input in the axial direction and characteristics such as the high dynamic spring required with respect to the input in the prizing direction can each be realized at a high degree.

In particular, since the second bushing 44 and the first bushing 16 are members separate from each other, it is easy to provide the first bushing 16 and the second bushing 44 in different materials and shapes. Therefore, the degree of freedom of design such as the material and shape of the first bushing 16 and the second bushing 44 is largely obtained, and the performance required of the first bushing 16 and the performance required of the second bushing 44 can each be realized at a higher degree.

In the vehicle body damper brace 10, the regulator receiving an input in the prizing direction comprises the second bushing 44 having a bushing structure including the second connection body 50 comprising a viscoelastic material. Therefore, when the vehicle body damper brace 10 receives a load in the prizing direction, adverse effects on the ride comfort of the vehicle or the like can be reduced by the buffering action of the second bushing 44. Also, the spring characteristics and damping characteristics in the axial direction or the like can be adjusted not only by the first bushing 16 but also by the second bushing 44.

The second bushings 44 are disposed on the axially opposite sides of the first connection body 36. Thus, when the rod member 12 and the housing 14 relatively tilt, the respective second connection bodies 50, 50 are compressed on the axially opposite sides of the first connection body 36. As a result, the load input by the relative tilting of the rod member 12 and the housing 14 is shared by the second connection bodies 50, 50 of the second bushings 44, 44, thereby improving the durability of the second connection bodies 50, 50.

Since the relative displacement between the rod member 12 and the housing 14 in the axial direction is permitted to some extent by the elastic deformation of the first connection body 36, mechanical damage caused by the input in the prizing direction can be easily avoided. Also, even when the input in the axial direction acts under the input in the prizing direction, stable characteristics such as the damping performance targeted in the axial direction, for example, can be maintained on the basis of the elastic deformation of the first connection body 36.

Figure 7:
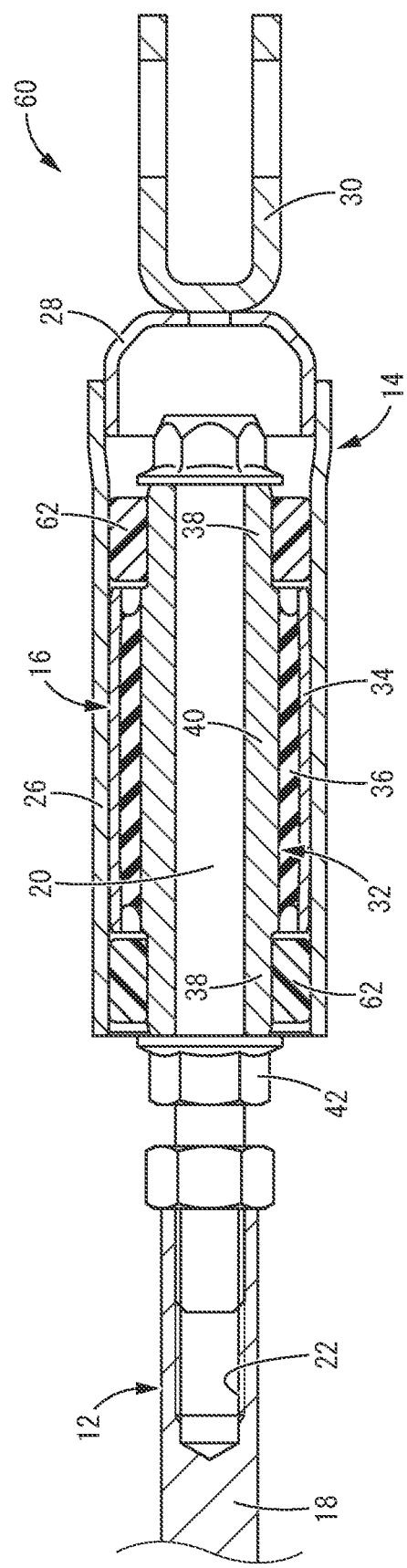
FIG. 7 is a vertical cross sectional view showing a part of a vehicle body damper brace according to a second practical embodiment of the present invention.

FIG. 7 shows a portion of a vehicle body damper brace 60 according to a second practical embodiment of the present invention. In the following description, components and parts that are substantially identical with those in the preceding first practical embodiment will be assigned like symbols and not described in any detail.

The vehicle body damper brace 60 has a structure in which ring-shaped members 62 serving as regulators are respectively attached to the mounting parts 38, 38 of the inner tube member 32 constituting the first bushing 16. The ring-shaped member 62 is a rigid member formed of a synthetic resin, a metal or the like. The ring-shaped member 62 of the present practical embodiment is formed of a rigid synthetic resin, and is different in material from the first bushing 16 having the first connection body 36 formed of a rubber or a resin elastomer. The ring-shaped member 62 has a generally C-letter annular shape divided at a part in the circumferential direction. In the ring-shaped member 62, the axially opposite ends on the outer circumferential side are chamfered, so that the axial length dimension of the outer circumferential surface is smaller than the axial length dimension of the inner circumferential surface.

The ring-shaped member 62 is mounted to the mounting part 38 of the inner tube member 32 in an externally fitted state. The ring-shaped member 62 has an inner diameter dimension smaller than an outer diameter dimension of the mounting part 38, and is attached to the mounting part 38 while being deformed so as to open the portion divided in the circumferential direction. This makes it possible to stably attach the ring-shaped member 62 to the mounting part 38 even if a manufacturing error occurs in the inner diameter dimension of the ring-shaped member 62.

The ring-shaped member 62 is fixed to the inner tube member 32 and is allowed to undergo relative displacement in the axial direction with respect to the tubular part 26 of the housing 14. The outer circumferential surface of the ring-shaped member 62 may be remote from the inner circumferential surface of the tubular part 26, but in preferred practice, is slidably in contact with the inner circumferential surface of the tubular part 26.

In this way, by providing the rigid ring-shaped members 62, 62 on the outer side in the axial direction than the first connection body 36 of the first bushing 16, the relative prizing displacement (tilting) of the rod member 12 and the housing 14 is suppressed by the ring-shaped member 62. In particular, since the ring-shaped member 62 is made rigid, the effect of suppressing the prizing displacement of the rod member 12 and the housing 14 is more reliably exhibited.

Since the outer circumferential surface of the ring-shaped member 62 is movable in the axial direction with respect to the housing 14, the ring-shaped member 62 hardly affects the axial characteristics of the vehicle body damper brace 60 even if the rigid ring-shaped member 62 is provided. Therefore, when the load in the axial direction is input, the soft spring characteristics by the shear spring component of the first connection body 36 is exhibited, thereby realizing the desired driving stability, ride comfort, and the like.

The ring-shaped member 62 is not limited to the C-shaped cross section divided at a part in the circumferential direction, but may be, for example, an annular shape continuous about the entire circumference. The ring-shaped member 62 may be formed by arranging, for example, semi-annular two members extending for approximately a half of the circumference face-to-face so as to be annular overall.

Figure 8:
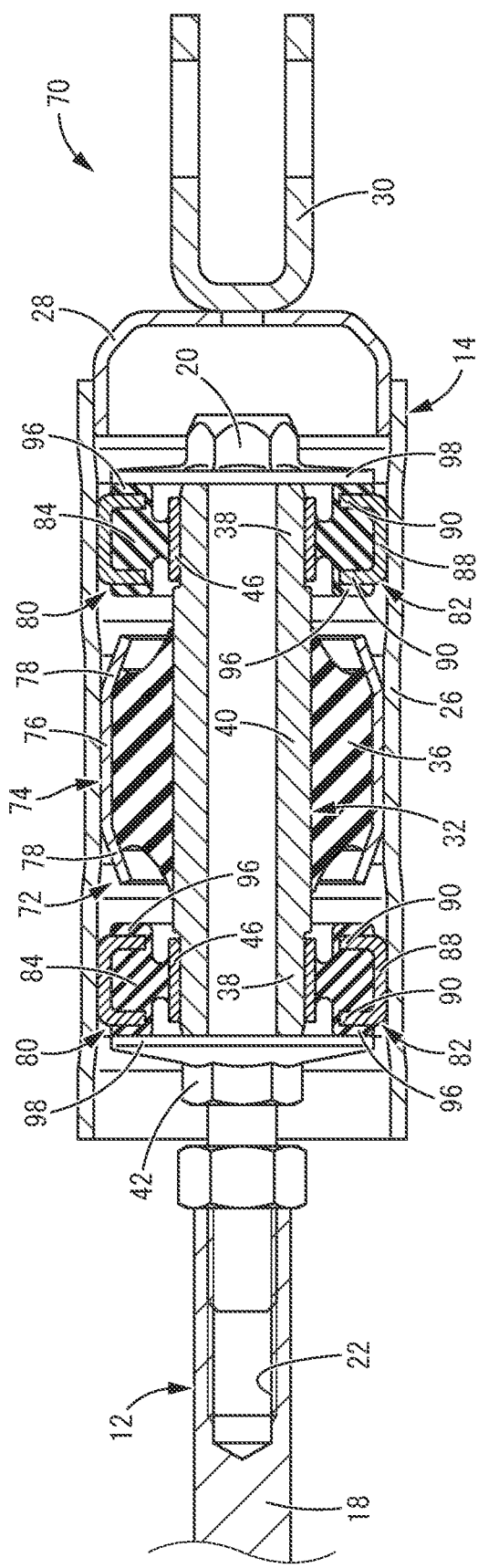
FIG. 8 is a vertical cross sectional view showing a part of a vehicle body damper brace according to a third practical embodiment of the present invention.

FIG. 8 shows a portion of a vehicle body damper brace 70 according to a third practical embodiment of the present invention. The vehicle body damper brace 70 has a structure in which the rod member 12 and the housing 14 are elastically connected to each other by a first bushing 72 serving as an elastic connector. The first bushing 72 has a structure in which the inner tube member 32 and an outer tube member 74 are elastically connected by the first connection body 36.

The outer tube member 74 has a thin-walled, large-diameter, generally cylindrical shape overall. In the outer tube member 74, the axially central portion comprises a straight part 76 extending with approximately constant inner and outer diameter dimensions, and the axially opposite end portions comprise tapered parts 78, 78 decreasing in diameter toward the outside in the axial direction.

The outer tube member 74 is placed externally about the inner tube member 32, and is bonded by vulcanization to the outer circumferential surface of the first connection body 36 formed radially between the inner tube member 32 and the outer tube member 74. The outer tube member 74 is formed into a straight tubular shape overall during vulcanization molding of the first connection body 36, and the tapered parts 78, 78 are formed at the axially opposite end portions during drawing process after the first connection body 36 is molded. By so doing, distortion due to shrinkage after vulcanization molding of the first connection body 36 is reduced, and the spring characteristics of the first connection body 36 are adjusted.

The outer tube member 74 is fixed to the tubular part 26 of the housing 14 by means of press-fitting or the like in the same manner as the preceding practical embodiment. The outer tube member 74 of the present practical embodiment is fixed by press-fitting to the tubular part 26 at the straight part 76, and the tapered parts 78 are remote radially inward from the tubular part 26, for example.

Figure 9:
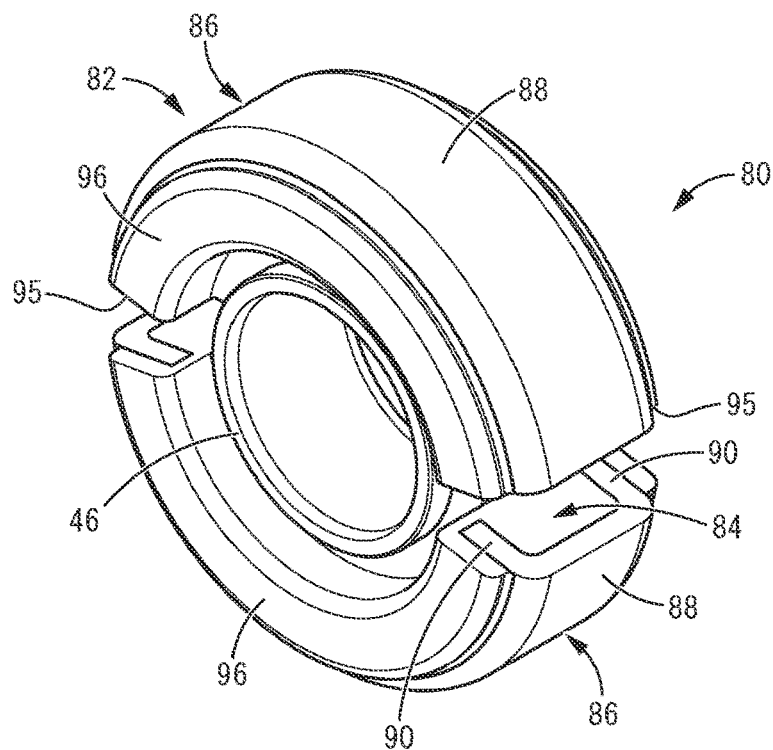
FIG. 9 is a perspective view of a second bushing constituting the vehicle body damper brace shown in FIG. 8.
Figure 10:
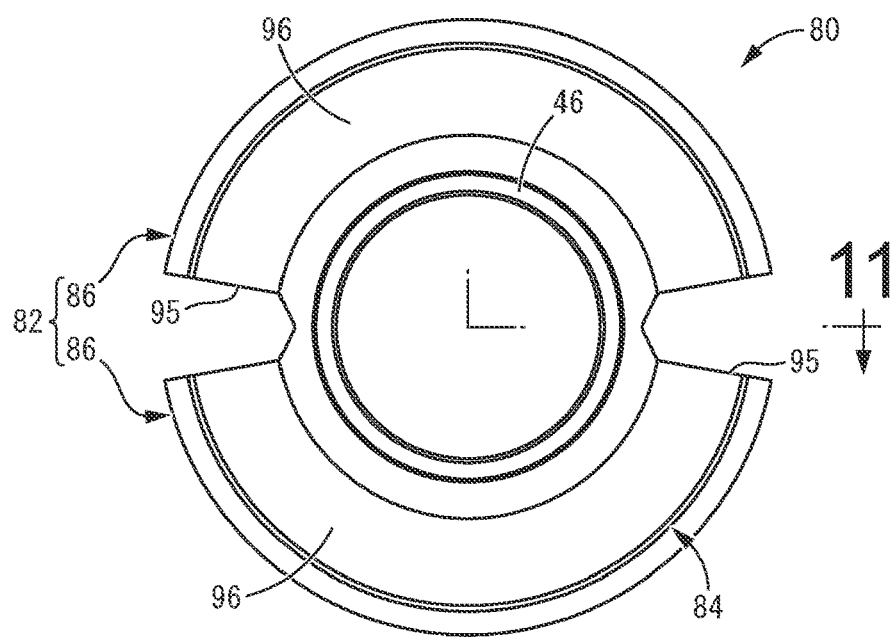
FIG. 10 is a left side view of the second bushing shown in FIG. 9.
Figure 11:
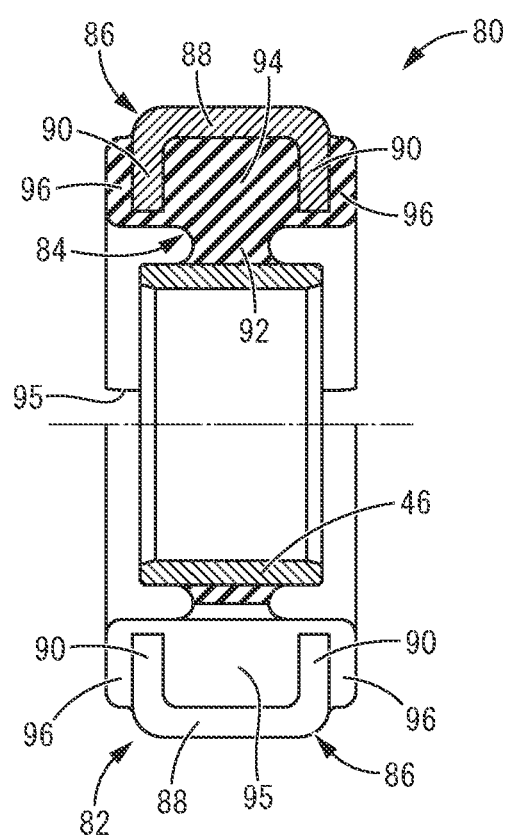
FIG. 11 is a cross sectional view taken along line 11-11 of FIG. 10.

To the axially opposite end portions of the inner tube member 32 of the first bushing 72, second bushings 80 serving as regulators are respectively attached. As shown in FIGS. 9-11, the second bushing 80 has a structure in which the inner attachment member 46 and an outer attachment member 82 are elastically connected by a second connection body 84.

The outer attachment member 82 is constituted by a pair of outer constituent fittings 86, 86 which are disposed in opposition to each other in the diametrical direction. The outer constituent fitting 86 has a U-shaped groove-like cross section opening radially inward, and extends in the circumferential direction with a length less than half the circumference. More specifically, the outer constituent fitting 86 includes a tubular bottom wall 88 and a pair of side walls 90, 90 projecting radially inward at the axially opposite ends of the bottom wall 88. The pair of outer constituent fittings 86, 86 are disposed with the inner attachment member 46 sandwiched in the diametrical direction, and the outer attachment member 82 is arranged in an externally fitted state with respect to the inner attachment member 46. The outer attachment member 82 has a plane symmetrical shape (an axially symmetrical shape in the left-right direction in FIG. 8) with respect to a plane orthogonal to the axial direction. Besides, the outer attachment member 82 has a rotationally symmetrical shape of 180° with respect to the central axis.

The second connection body 84 has an annular shape overall, and as shown in FIG. 11, a radially inner portion 92 is thinner in the axial direction than a radially outer portion 94. The radially inner portion 92 of the second connection body 84 has a width dimension in the axial direction that is smaller than the distance between the opposed faces of the pair of side walls 90, 90 in the outer attachment member 82.

The wide radially outer portion 94 of the second connection body 84 is fastened to the inner surface of the outer attachment member 82 having a groove-like cross section. The radially inner portion 92 of the second connection body 84 protrudes to the radially inner side than the outer attachment member 82 and is fastened to the inner attachment member 46. The second connection body 84 takes the form of an integrally vulcanization molded component including the inner attachment member 46 and the outer attachment member 82.

As shown in FIG. 10, the second connection body 84 includes notches 95, 95 opened radially outward circumferentially between the outer constituent fittings 86, 86.

Regarding the inner surface of the notch 95, the bottom part, which is the inner circumferential surface, extends in the axial direction with a V-shaped cross section, while the circumferentially opposite side surfaces are remote from each other in the circumferential direction and extend in a generally radial direction, and the remote distance in the circumferential direction increases radially outward. Regarding the second connection body 84, as shown in FIG. 11, in the portion forming the notch 95, only the radially inner end of the radially inner portion 92 is continuous in the circumferential direction.

A buffer body 96 is fastened to the side walls 90 of the outer constituent fitting 86 constituting the outer attachment member 82. The buffer body 96 is integrally formed with the second connection body 84. The buffer body 96 is fastened to the axial outer face of the side walls 90, and is continuous with the second connection body 84 on the radially inner side of the side wall 90. The buffer body 96 is provided so as to be fastened to each of the pair of side walls 90. With this configuration, the second bushing 80 has a plane symmetrical shape (an axially symmetrical shape in the left-right direction in FIG. 8) with respect to a plane orthogonal to the axial direction. Besides, the second bushing 80 has a rotationally symmetrical shape of 180° with respect to the central axis.

As shown in FIG. 8, the second bushing 80 is interposed radially between the inner tube member 32 and the housing 14 by the inner attachment member 46 being externally fitted onto the axially opposite end portions of the inner tube member 32 while the outer attachment member 82 being fitted into the tubular part 26 of the housing 14. With this arrangement, the rod member 12 and the housing 14 are connected not only by the first bushing 72 but also by the second bushing 80.

The side wall 90 on the axially outer side of the outer attachment member 82 of each second bushing 80 is opposed in the axial direction to a corresponding first flanged part 98 provided in the head part of the inner bolt 20 and the nut 42. The first flanged part 98 is provided on the inner bolt 20 and the nut 42 constituting the rod member 12, and protrudes radially outward from the rod member 12. The buffer body 96 is disposed between the axially opposed faces of the first flanged part 98 and the side wall 90, and the first flanged part 98 and the side wall 90 are indirectly in contact with each other via the buffer body 96. In the present practical embodiment, the second flanged part opposed to the first flanged part 98 is constituted by the side wall 90 on the axially outer side of the outer attachment member 82.

The buffer body 96 is interposed between the first flanged part 98 and the side wall 90 serving as the second flanged part. Thus, during input in the axial direction between the inner tube member 32 and the housing 14, the buffer body 96 is compressed in the axial direction between the first flanged part 98 and the side wall 90. Due to the compression spring component of the buffer body 96, harder spring characteristics in the axial direction can be obtained, it is possible to set the spring characteristics in the axial direction of the vehicle body damper brace 70 with a greater degree of freedom in tuning. Therefore, when hard spring characteristics in the axial direction is required of the vehicle body damper brace 70 for the purpose of improving steering stability or the like, the required performance can be easily satisfied. In particular, in the present practical embodiment, since the thickness dimension in the axial direction of the buffer body 96 is sufficiently smaller than the thickness dimensions in the radial direction of the first connection body 36 and the second connection body 84, it is easy to set harder spring characteristics in the axial direction.

When the force in the prizing direction which causes relative tilting between the rod member 12 and the housing 14 acts, the second bushing 80 limits relative prizing displacement (tilting) of the rod member 12 and the housing 14 based on the elasticity or the like of the second connection body 84, similarly to the second bushing 44 of the first practical embodiment. Besides, the side wall 90 of the second bushing 80 and the first flanged part 98 are disposed in opposition on the axially opposite sides. Thus, the tilting of the rod member 12 and the housing 14 is limited also by the first flanged part 98 and the side wall 90 coming into contact with each other via the buffer body 96. In this way, in the present practical embodiment, the regulator for suppressing the prizing displacement of the rod member 12 and the housing 14 is constituted not only by the second bushing 80 by itself but also by cooperation of the side wall 90 of the second bushing 80 and the first flanged part 98.

Regarding the second connection body 84 of the second bushing 80, the radially inner portion 92, which protrudes to the radially inner side than the outer tube member 74, is made thin in the axial direction, and the spring characteristics of the second connection body 84 are adjusted. With this configuration, appropriate spring characteristics can be set for the input in each of the diametrical direction, the axial direction, and the prizing direction.

The second connection body 84 is provided with the pair of notches 95, 95 on the diametrically opposite sides in the radial direction. Thus, the spring constant in the diametrical direction is made small, and the vibration damping performance of the first connection body 36 to be exhibited with respect to the input in the diametrical direction is hardly hampered by the second bushing 80.

In the present practical embodiment, each first flanged part 98 provided on the head part of the inner bolt 20 and the nut 42 is disposed on the outer side in the axial direction than the side wall 90 on the axially outer side serving as the second flanged part. However, for example, by externally fitting and fixing an annular member having a first flanged part to the inner tube member 32 or the like, the first flanged part can also be disposed on the inner side in the axial direction than the side wall 90 on the axially inner side. That is, the first flanged part may be disposed axially between the first connection body 36 and the second connection body 84. The first flanged part may be provided on both the outer side in the axial direction than the side wall 90 on the axially outer side, and the inner side in the axial direction than the side wall 90 on the axially inner side. In this case, for example, the opposed areas of the first flanged part and the side wall 90, the shapes, sizes, materials, and the like of the buffer bodies 96 may be different from each other on the opposite sides in the axial direction.

Figure 12:
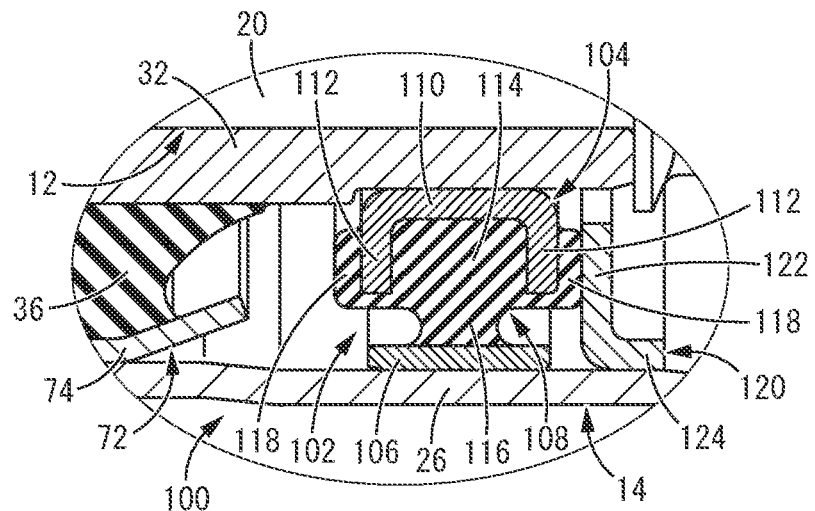
FIG. 12 is a vertical cross sectional view showing a part of a vehicle body damper brace according to a fourth practical embodiment of the present invention.

FIG. 12 shows a portion of a vehicle body damper brace 100 according to a fourth practical embodiment of the present invention. The vehicle body damper brace 100 of the present practical embodiment includes a second bushing 102 serving as a regulator on the outer side in the axial direction of the first bushing 72. The second bushing 102 has a structure in which an inner attachment member 104 and an outer attachment member 106 are elastically connected by a second connection body 108.

The inner attachment member 104 has a U-shaped groove-like cross section opening radially outward overall. More specifically, the inner attachment member 104 is integrally provided with a tubular bottom wall 110 extending in the axial direction and a pair of side walls 112, 112 serving as first flanged parts extending radially outward from the axially opposite ends of the bottom wall 110.

The outer attachment member 106 has a cylindrical shape extending straightly in the axial direction. The outer attachment member 106 is disposed externally about and is remote radially outward from the inner attachment member 104.

A second connection body 108 is interposed between the inner attachment member 104 and the outer attachment member 106. Regarding the second connection body 108, a radially inner portion 114 is wider in the axial direction than a radially outer portion 116, and the radially inner portion 114 is fastened to the inner surface of the inner attachment member 104, while the radially outer portion 116 is fastened to the inner circumferential surface of the outer attachment member 106.

A buffer body 118 is fastened to the side walls 112, 112 of the inner attachment member 104. Whereas the buffer body 118 may be a separate body from the second connection body 108, in the present practical embodiment, the buffer body 118 is integral with the second connection body 108. The buffer body 118 is fastened to the outer surface of the side wall 112.

The second bushing 102 is interposed between the rod member 12 and the housing 14 by the bottom wall 110 of the inner attachment member 104 being fixed to the axial end portion of the inner tube member 32 in an externally fitted state and the outer attachment member 106 being fixed to the tubular part 26 of the housing 14 in an internally fitted state.

A flange fitting 120 serving as a regulator is fixed to the tubular part 26 of the housing 14. The flange fitting 120 is an annular member extending in the circumferential direction with an L-shaped cross section, and includes a second flanged part 122 having an annular disk shape and a fitting part 124 projecting outward in the axial direction from the outer peripheral end of the second flanged part 122. By the fitting part 124 being fixed to the tubular part 26 of the housing 14 by press-fitting or the like, for example, the second flanged part 122 is held in a state protruding radially inward from the tubular part 26. The second flanged part 122 is located on the outer side in the axial direction than the second bushing 102, and is opposed to the side wall 112 serving as the first flanged part in the axial direction. The buffer body 118 is disposed between the opposed side wall 112 and second flanged part 122, and in the present practical embodiment, the second flanged part 122 is in contact with the buffer body 118.

According to the vehicle body damper brace 100 structured following the present practical embodiment, the relative prizing displacement (tilting) of the rod member 12 and the housing 14 due to input in the prizing direction is suppressed not only by the elasticity and damping of the second connection body 108 but also by the side wall 112 and the second flanged part 122 coming into contact with each other via the buffer body 118.

Besides, the hard spring characteristics in the axial direction can be set by the buffer body 118 disposed between the side wall 112 and the second flanged part 122 that are opposed in the axial direction.

In the present practical embodiment, the second flanged part 122 is disposed on the outer side in the axial direction of the second bushing 102. However, the second flanged part 122 may be disposed on the inner side in the axial direction than the second bushing 102, and for example, may be disposed between the first bushing 72 and the second bushing 102 in the axial direction. In this case, in the second bushing 102, the side wall 112 on the axially inner side, which is located on the first bushing 72 side, comprises the first flanged part 98. The second flanged part 122 may be provided on both the outer side and the inner side in the axial direction with respect to the second bushing 102. In this case, the second flanged parts 122, 122 on both sides in the axial direction may have different shapes and sizes from each other.

Figure 13:
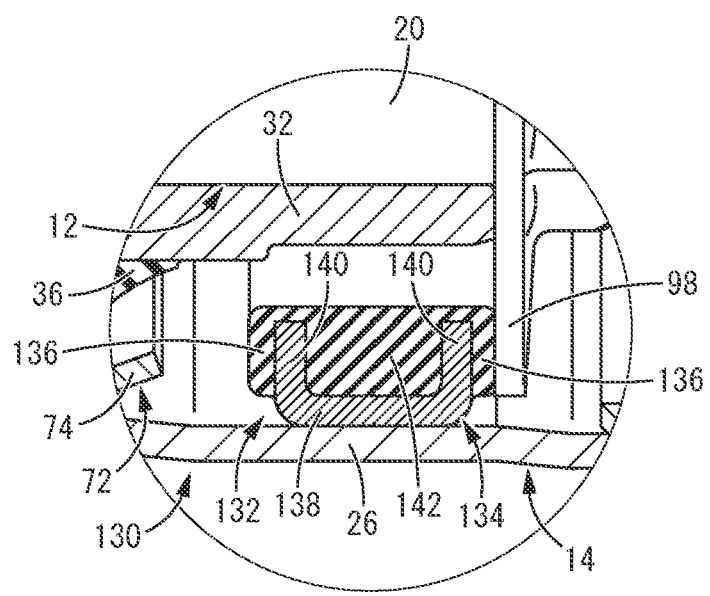
FIG. 13 is a vertical cross sectional view showing a part of a vehicle body damper brace according to a fifth practical embodiment of the present invention.

FIG. 13 shows a portion of a vehicle body damper brace 130 according to a fifth practical embodiment of the present invention. The vehicle body damper brace 130 of the present practical embodiment is provided with a stopper member 132 serving as a regulator on the outer side in the axial direction of the first bushing 72. The stopper member 132 has a structure in which a buffer body 136 is fastened to a stopper fitting 134.

The stopper fitting 134 has a U-shaped groove-like cross section opening radially inward. More specifically, the stopper fitting 134 includes a cylindrical bottom wall 138 and a pair of annular disk-shaped side walls 140, 140 projecting radially inward from the axially opposite ends of the bottom wall 138. The stopper fitting 134 of the present practical embodiment has such a structure that the outer constituent fittings 86, 86 of the third practical embodiment are continued in the circumferential direction.

The buffer body 136 is formed of a viscoelastic material and is fastened to the outer surfaces on the axially opposite sides of the stopper fitting 134. In the present practical embodiment, an intermediate continuous part 142 that comprises a viscoelastic material and is integrally formed with the buffer body 136 is fastened to the inner surface of the stopper fitting 134, and the buffer bodies 136, 136 on the axially opposite sides are connected to each other. With this configuration, the buffer bodies 136, 136 on the axially opposite sides are integrated, and the fastened area of the buffer bodies 136, 136 and the intermediate continuous part 142 with respect to the stopper fitting 134 is made large, thereby improving the fastening strength.

The side wall 140 on the axially outer side of the stopper fitting 134 is opposed to the first flanged part 98 in the axial direction, and the buffer body 136 is disposed between the opposed first flanged part 98 and side wall 140. The first flanged part 98 may be remote from the buffer body 136 in the axial direction, but in the present practical embodiment, the first flanged part 98 is in contact with the buffer body 136. The side wall 140 on the axially outer side of the stopper fitting 134 constitutes the second flanged part of the present practical embodiment.

According to the vehicle body damper brace 130, similarly to the preceding practical embodiment, displacement regulation of the rod member 12 and the housing 14 in the prizing direction and a sufficient degree of freedom in tuning the spring characteristics in the axial direction can be achieved by the contact of the first flanged part 98 and the side wall 140 serving as the second flanged part via the buffer body 136. In the present practical embodiment, the regulator for limiting the amount of prizing displacement of the rod member 12 and the housing 14 does not have a bush structure, but is constituted by the first flanged part 98 provided on the rod member 12 side and the side wall 140 provided on the housing 14 side coming into contact with each other via the buffer body 136. This reduces the influence of the regulator on the spring characteristics of the vehicle body damper brace 130. In this way, the regulator is not limited to the bushing structure, but it is acceptable as long as the regulator limits the amount of prizing displacement of the rod member 12 and the housing 14.

While the present invention has been described in detail hereinabove in terms of the practical embodiments, the invention is not limited by the specific disclosures thereof. For example, the regulator may be movable in the axial direction with respect to the rod member 12. The regulator may be movable in the axial direction with respect to both the rod member 12 and the housing 14 if the regulator is kept mounted between the rod member 12 and the housing 14.

The regulator may be provided only on one side in the axial direction with respect to the first connection body. It would also be possible to provide a plurality of regulators on one side in the axial direction with respect to the first connection body, or to provide a plurality of regulators on both sides in the axial direction with respect to the first connection body.

The first bushing 16 of the preceding practical embodiment has a tubular body that is continuous about the entire circumference. However, for example, the outer tube member 34 may have a C-shaped cross section divided at a part in the circumferential direction, similarly to the outer attachment member 48 of the second bushing 44. With this configuration, it is possible to reduce the tensile stress due to the cooling shrinkage after molding of the first connection body 36 without requiring the diameter reduction process or the like of the outer tube member 34.

It would also be possible to form the outer attachment member 48 of the second bushing 44 into a tubular body that is continuous about the entire circumference like the outer tube member 34 of the first bushing 16, and to subject the outer attachment member 48 to the diameter reduction process after molding of the second connection body 50, thereby reducing the tensile stress due to the thermal shrinkage of the second connection body 50. Thus, the notches 52, 54 are not essential in the outer attachment member 48 and the second connection body 50 of the second bushing 44. Even if the outer attachment member 48 and the outer tube member 34 are C-shaped, diameter reduction process can be applied to further reduce the tensile stress.

The first connection body 36 may be directly fastened to the rod member 12 (the inner bolt 20), and the inner tube member 32 may be omitted. The first connection body 36 may be directly fastened to the tubular part 26 of the housing 14, and the outer tube member 34 may be omitted.

The second bushing 44 of the first practical embodiment is mounted on the inner tube member 32 in an externally fitted state, and is attached to the rod member 12 via the inner tube member 32. However, the second bushing 44 can be directly attached to the rod member 12.

The specific structure of the regulator is not limited by exemplification in the preceding practical embodiments. For example, the second connection body 50 may be directly fastened to the rod member 12 or the housing 14. Besides, the regulator may, for example, adopt a structure in which a radially outer portion formed of a rigid synthetic resin is provided on the outer circumferential surface of the inner attachment member 46, or the like.

The axial length dimension of the second connection body 50 may be equal to or greater than the axial length dimension of the first connection body 36. In this case, it is desirable to sufficiently suppress the influence of the second connection body 50 on the axial characteristics of the vehicle body damper brace 10 by a factor other than the difference in the axial length dimensions of the first connection body 36 and the second connection body 50. Specifically, for example, by forming the first connection body 36 and the second connection body 50 with different viscoelastic materials, it is possible to set the shear spring component of the second connection body 50 with respect to the input in the axial direction sufficiently smaller than the shear spring component of the first connection body 36.

What is claimed is:

1. A vehicle body damper brace comprising:
    a rod member having an elongated shape in an axial direction;
    a housing including a tubular part arranged externally about the rod member;
    an elastic connector including a first connection body comprising a viscoelastic material, the elastic connector elastically connecting the rod member and the housing to each other in an axis-perpendicular direction; and
    a regulator provided on at least one axial side of the first connection body and separately from the elastic connector, the regulator suppressing an amount of relative displacement between the rod member and the housing in a prizing direction, wherein
    a first mounting part is provided to the rod member and a second mounting part is provided to the housing, the first and second mounting members being configured to attach to the vehicle body at respective positions on opposite sides of the elastic connector in the axial direction such that a load in the axial direction is primarily input to the rod member and the housing, and
    wherein the regulator has a structure in which an inner attachment member attached to a rod member side and an outer attachment member attached to a housing side are elastically connected by a second connection body comprising a viscoelastic material.

2. The vehicle body damper brace according to claim 1, wherein materials of the elastic connector and the regulator are different from each other.

3. The vehicle body damper brace according to claim 1, wherein an axial dimension of the second connection body of the regulator is smaller than an axial dimension of the first connection body of the elastic connector.

4. The vehicle body damper brace according to claim 1, further comprising:
    a first flanged part projecting radially outward and provided in a side of the rod member, and
    a second flanged part projecting radially inward provided in the outer attachment member, wherein
    a buffer body made of a viscoelastic material is interposed between axially opposed faces of the first flanged part and the second flanged part.

5. The vehicle body damper brace according to claim 1, wherein the regulator is movable in an axial direction with respect to at least one of the rod member and the housing.

6. The vehicle body damper brace according to claim 1, wherein the regulator includes a first flanged part projecting radially outward from the rod member side, a second flanged part projecting radially inward from a tubular part side of the housing, and a buffer body arranged between axially opposed faces of the first flanged part and the second flanged part while comprising a viscoelastic material.

7. The vehicle body damper brace according to claim 1, wherein
    an inner circumferential surface of the first connection body is fastened to an inner tube member fixed to the rod member in an externally fitted state, and
    the regulator is attached to the inner tube member in an externally fitted state.

8. The vehicle body damper brace according to claim 1, wherein the regulator is arranged axially away from the first connection body of the elastic connector.

9. The vehicle body damper brace according to claim 1, wherein the regulator extends in a circumferential direction, and the regulator is divided at least at a part in the circumferential direction.

10. A vehicle body damper brace comprising:
   a rod member having an elongated shape;
   a housing including a tubular part arranged externally about the rod member;
   an elastic connector including a first connection body comprising a viscoelastic material, the elastic connector elastically connecting the rod member and the housing to each other in an axis-perpendicular direction; and
   a regulator provided on at least one axial side of the first connection body and separately from the elastic connector, the regulator suppressing an amount of relative displacement between the rod member and the housing in a prizing direction, and the regulator having a structure in which an inner attachment member attached to a rod member side and an outer attachment member attached to a housing side are elastically connected by a second connection body comprising a viscoelastic material,
   a first flanged part projecting radially outward and provided in a side of the rod member; and
   a second flanged part projecting radially inward provided in the outer attachment member, wherein
   a buffer body made of a viscoelastic material is interposed between axially opposed faces of the first flanged part and the second flanged part, and
   the outer attachment member extends in a circumferential direction with a U-shaped cross section opening radially inward, and at least one of a pair of side walls of the outer attachment member comprises the second flanged part.

* * * * *